(12) United States Patent
Wolowicz (10) Patent No.: US 9,908,072 B2
(45) Date of Patent: Mar. 6, 2018

(54) SYSTEM AND METHOD FOR REPLACING AIR FILTERS

(71) Applicant: Lennox Industries Inc., Richardson, TX (US)

(72) Inventor: Thomas J. Wolowicz, Allen, TX (US)

(73) Assignee: Lennox Industries Inc., Richardson, TX (US)

( * ) Notice: Subject to any disclaimer, the term of this patent is extended or adjusted under 35 U.S.C. 154(b) by 322 days.

(21) Appl. No.: 14/876,646

(22) Filed: Oct. 6, 2015

(65) Prior Publication Data

US 2017/0095762 A1    Apr. 6, 2017

(51) Int. Cl.
*B01D 46/00* (2006.01)
*B01D 46/44* (2006.01)

(52) U.S. Cl.
CPC ....... *B01D 46/0086* (2013.01); *B01D 46/008* (2013.01); *B01D 46/444* (2013.01); *B01D 46/446* (2013.01)

(58) Field of Classification Search
CPC  B01D 46/0086; B01D 46/444; B01D 46/446; B01D 46/42; B01D 46/44; F24F 3/1603
See application file for complete search history.

(56) References Cited

U.S. PATENT DOCUMENTS

2005/0247194 A1*  11/2005  Kang ............... B01D 46/0086
                                                95/19
2010/0017151 A1*   1/2010  Kerrigan ......... B01D 46/0086
                                                702/47

OTHER PUBLICATIONS

Peter Dyment; "The benefits of changing HVAC particulate air filters by increased pressure drop and not time," Camfil; http://www.lowerenergyairfilter.co.uk/2012/02/the-benefits-of-changing-hvac-particulate-air-filters-by-increased-pressure-drop-and-not-time/; 2 pages, printed Jul. 9, 2015.

* cited by examiner

*Primary Examiner* — Robert Clemente
(74) *Attorney, Agent, or Firm* — Baker Botts L.L.P.

(57) ABSTRACT

A system comprising a sensor coupled to a filter having a filter type. The sensor measures pressure drop across the filter and communicates with the controller. An air handler pushes air through the filter and communicates with a controller. The controller comprises an interface connection, a memory, and a microprocessor. The interface connection receives the air flow rate of the air handler and the pressure drop across the filter. The memory stores the relationship between pressure drop and air flow rate for a filter of the same filter type when the filter is clean and when the filter is exhausted. The memory also stores the relationship between pressure drop and the life of a filter of the filter type. The processor determines the remaining life of the filter using the received and stored information. The display receives information from the controller and displays the information.

20 Claims, 3 Drawing Sheets

SYSTEM AND METHOD FOR REPLACING AIR FILTERS

TECHNICAL FIELD

This disclosure relates generally to HVAC (heating, ventilating, and air conditioning) systems, and more specifically to system and method for replacing air filters.

BACKGROUND

HVAC systems often have filtering components that use air filters. These filters deteriorate over time and need to be replaced. Present HVAC systems are unable to determine when the filter needs to be replaced. Thus, methods and systems are needed to determine when filters in HVAC systems need to be replaced.

SUMMARY OF THE DISCLOSURE

According to embodiments of the present disclosure, a system comprising a filter having a filter type, a sensor operable to communicate with a controller, the sensor being coupled to the filter and operable to measure a pressure drop across the filter, an air handler operable to communicate with the controller and push air through the filter at a particular air flow rate, and a controller is disclosed. The controller comprises an interface connection operable to receive first information indicating the air flow rate of the air handler and second information indicating the pressure drop across the filter. The controller further comprises a memory operable to store a first relationship between pressure drop and air flow rate for the filter type when the filter is exhausted, a second relationship between pressure drop and air flow rate for the filter type when the filter is clean, a third relationship between pressure drop and remaining life for the filter type at one or more air flow rates, and an operating region defined by an air flow rate that is greater than a minimum air flow rate and lower than a maximum air flow rate and a pressure drop that is lower than the pressure drop generated from the first relationship and higher than the pressure drop generated from the second relationship. The controller also comprises a microprocessor operable to determine whether the first information and the second information are within the operating region and in response to determining that the first information and the second information are within the operating region, generate a fourth information indicating the remaining life of the filter using the third relationship stored in the memory. The system further comprises a display coupled to the controller and operable to display the fourth information.

The present embodiment presents several technical advantages. First, in the present embodiment, the controller may accurately determine when a filter needs to be replaced. Second, the present embodiment can account for the filtering needs of different environments when determining whether a filter needs to be replaced. Third, the present embodiment is compatible with various different types of filters and air handlers running at different speeds. Fourth, the present embodiment may notify a user to replace the filter when the lifetime of the filter or the lifetime of a lamp, such as a UV lamp, that is coupled to the filter has expired.

Certain embodiments of the present disclosure may include some, all, or none of these advantages. One or more other technical advantages may be readily apparent to those skilled in the art from the figures, descriptions, and claims included herein.

BRIEF DESCRIPTION OF THE DRAWINGS

To provide a more complete understanding of the present disclosure and the features and advantages thereof, reference is made to the following description taken in conjunction with the accompanying drawings, in which.

DETAILED DESCRIPTION

Embodiments of the present disclosure and its advantages are best understood by referring to FIGS. 1 through 5 of the drawings, like numerals being used for like and corresponding parts of the various drawings.

HVAC systems are commonplace in homes and industrial settings. Such systems regulate the air quality and temperature of the environment in which they are installed. In some HVAC systems, air handlers heat or cool air and then push that air out into ducts that guide the air to a suitable location. For example, in a home, an air handler may heat air using a furnace and then push that heated air into ducts that release air into the various rooms of the home through vents.

HVAC systems sometimes include filtering systems that filter out odors, dust, and other particulate from air before the air enters the environment. In such filtering systems, air may pass through a physical air filter which traps particulate. As air passes through the air filter, there is a drop in the air pressure across the filter. The amount of drop in air pressure depends on the flow rate of the air flowing through the filter as well as the size and type of the filter. So, for example, at a higher flow rate, there is a larger pressure drop across the filter.

Over time, the particulate trapped by the air filter starts to build up. This causes an additional drop in air pressure across the filter. Over time, this additional pressure drop reaches a critical level where the filter is exhausted and can no longer effectively filter the air. At this point, the filter needs to be replaced. In some HVAC systems, the air filter may also be coupled to a lamp that emits light, such as ultraviolet (UV) light, for killing bacteria and deodorizing the air. The light burns out after a certain period of time and needs to be replaced as well. The light may be selected so that it burns out around the same time as the air filter is exhausted.

The present disclosure contemplates an embodiment that determines the remaining life of an installed filter and issues a notification when the filter needs to be replaced. In one embodiment, a sensor is placed on the air filter which measures the drop in air pressure as air moves through the filter at a certain air flow rate. A controller then compares this measured drop in air pressure against the predetermined drop in air pressure of a clean air filter and the predetermined drop in air pressure of an exhausted filter at that same air flow rate. The controller then uses this information to determine the remaining life of the filter. In at least one embodiment, this remaining life of the air filter is then displayed at a display. The controller may even issue an alert once the filter has expired. Because the disclosed system may provide an accurate measurement of the remaining life of the installed air filter, an operator can replace the air filter when the filter is exhausted.

Figure 1:
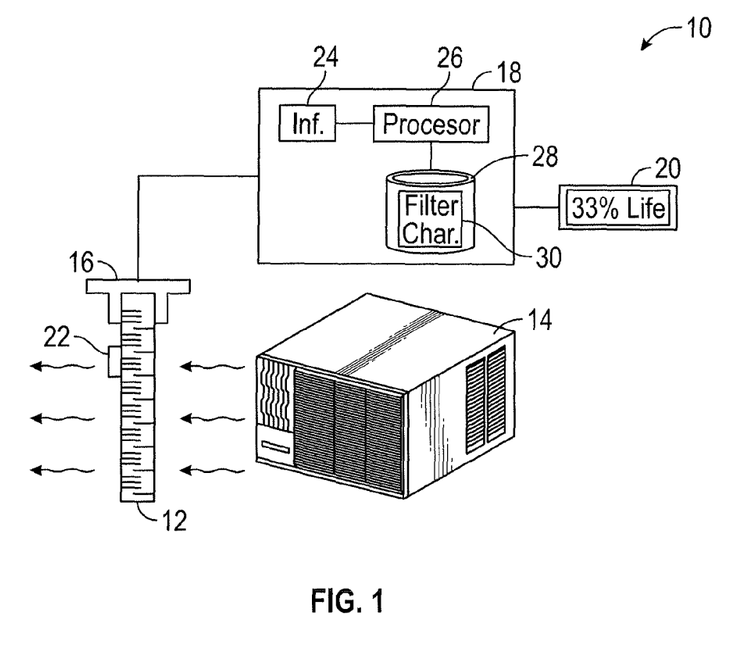
FIG. 1 illustrates a system for filtering air.
Figure 2:
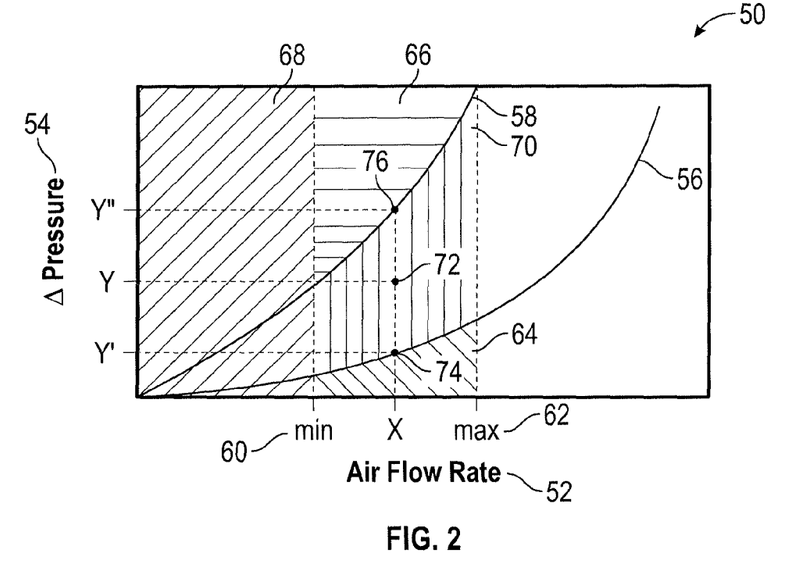
FIG. 2 illustrates a chart depicting the relationship between flow rate and pressure drop for a clean filter and an exhausted filter.
Figure 3:
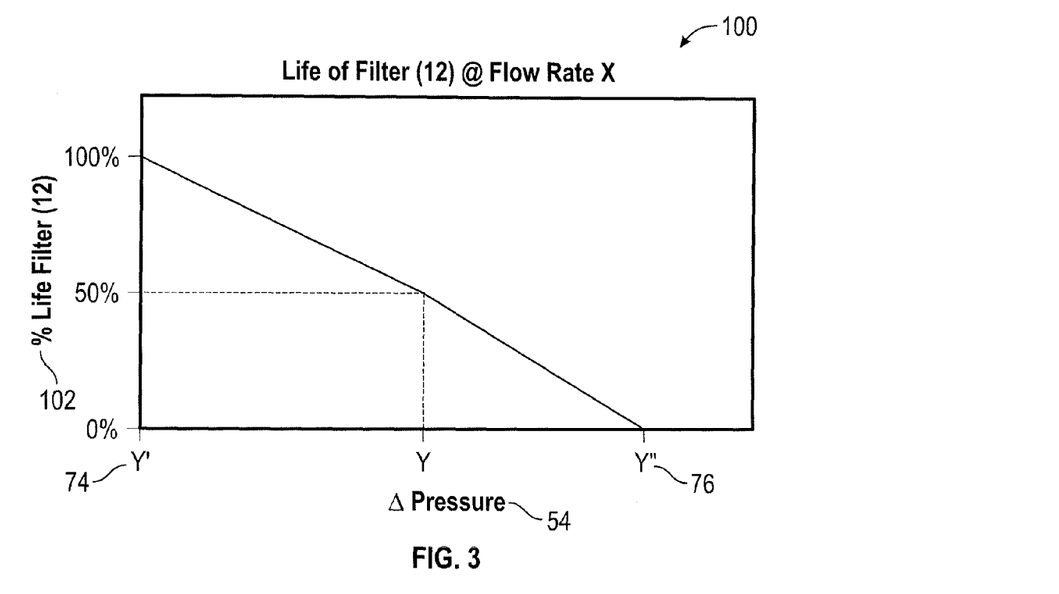
FIG. 3 illustrates a chart showing the relationship between the drop in pressure and the percentage of life remaining of a filter.
Figure 4:
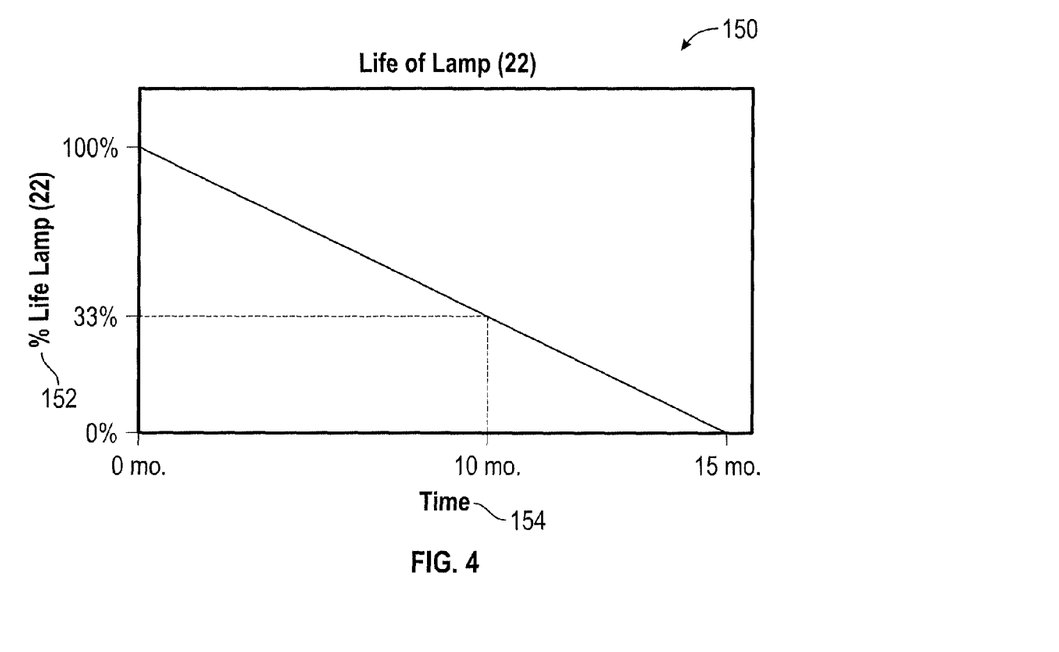
FIG. 4 illustrates a chart showing the relationship between the percent life remaining of a lamp and time elapsed since installation of the lamp.
Figure 5:
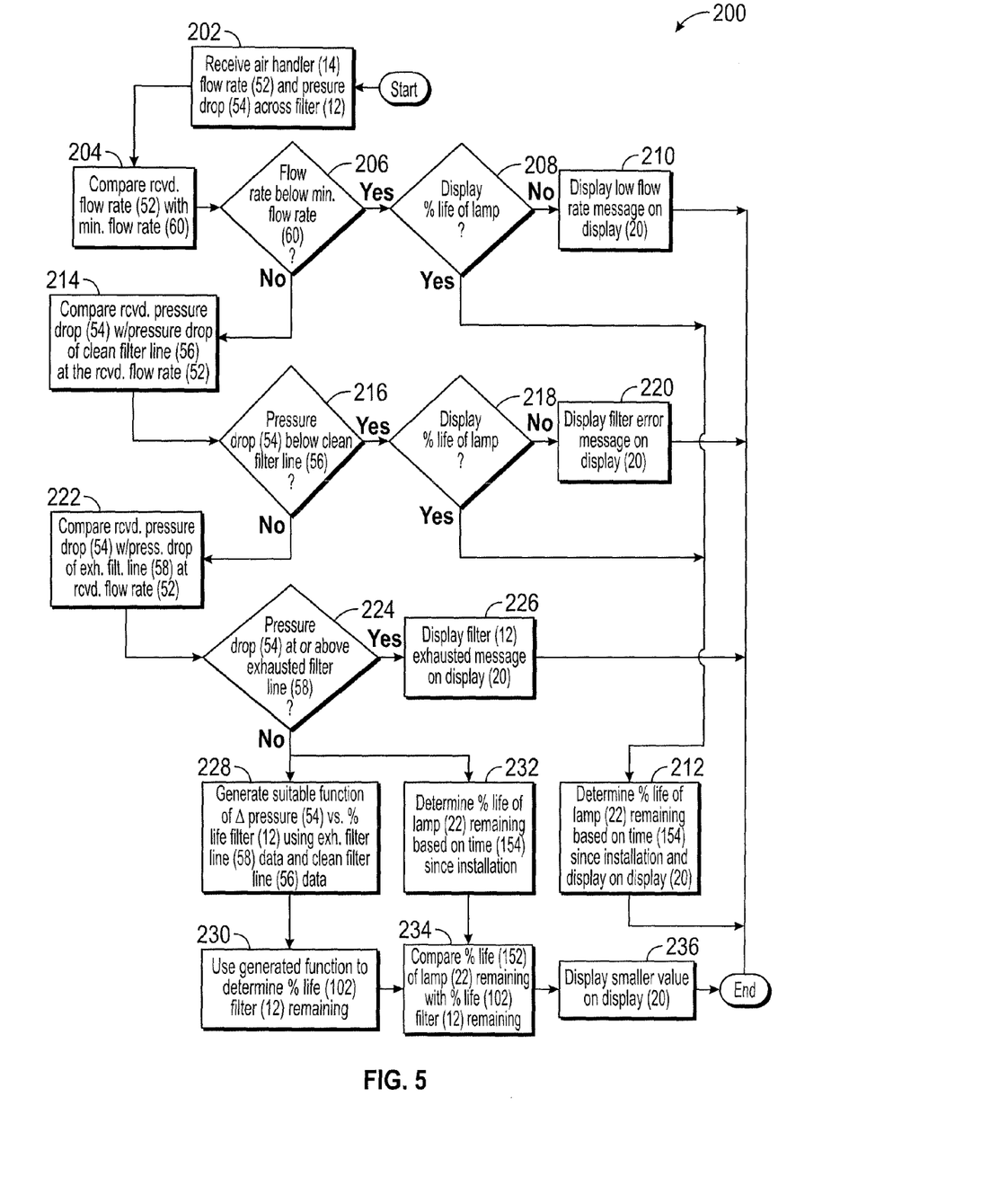
FIG. 5 illustrates a flowchart showing a method for determine the life of an air filter.

The present disclosure will be described in more detail using FIGS. 1 through 5. FIG. 1 illustrates a general overview of an air filtering system according to one embodiment of the present disclosure. FIG. 2 illustrates a chart showing the relationship between air flow rate and pressure drop for a clean and an exhausted filter. FIG. 3 illustrates the relationship between the remaining life of the filter and the drop in air pressure. FIG. 4 illustrates the relationship between the life of a lamp and time elapsed since the installation of the lamp. And FIG. 5 illustrates a flowchart showing the steps performed by a controller to determine the life of an air filter FIG. 1 illustrates a system 10 for filtering air. System 10 comprises an air filter 12, an air handler 14, a sensor 16, a controller 18, a display 20, and a lamp 22. In system 10, air handler 14 pushes air into air filter 12 and sensor 16 measures the drop in air pressure across air filter 12. Although the present embodiment shows filter 12 as being separate from air handler 14, in other embodiments filter 12 may be placed anywhere within system 10 including being incorporated within air handler 14, in any ducting coupled to air handler 14, or at any other suitable location. Controller 18 then uses this measured drop in air pressure along with the air flow rate of air handler 14 to determine the remaining life of air filter 12. Display 20 may then display the remaining life of filter 12.

The present embodiment presents several technical advantages. First, in the present embodiment, a controller 18 may accurately determine when a filter 12 needs to be replaced. This may reduce the guesswork in determining whether a filter 12 needs to be replaced or not. In this manner, exhausted filters 12 that can no longer filter air can be replaced promptly which reduces the amount of dust and other injurious particles from entering a closed environment. Second, the present embodiment can account for the filtering needs of different environments when determining whether a filter needs to be replaced. For example, filters 12 installed at a home near a construction zone may need to replaced more regularly than filters 12 installed in a rural environment. The present embodiment can differentiate between the needs of the different environments and notify the users to replace the filters 12 appropriately. Third, the present embodiment is compatible with various different types of filters 12 and air handlers 14 running at different speeds. For example, the present embodiment may issue a notification that filter 12 needs to be replaced even if the speed of air handler 14 is changed from a high to a low speed. Fourth, the present embodiment may issue a notification to replace filter 12 when the lifetime of lamp 22 that is coupled to filter 12 has expired. In some embodiments, lamp 22 may be selected so that the lifetime of lamp 22 is substantially similar to the average lifetime of filter 12. In this manner, system 10 may signal the need to replace filter 12 accurately even if controller 18 malfunctions.

In the present embodiment, filter 12 may be any device or apparatus, such as a housing that frames air filtering material, that may remove solid particulates such as dust, pollen, mold, and bacteria from the air. Filter 12 may contain chemicals for facilitating removing volatile or hazardous particulates. Filter 12 may be made of any suitable material including, without limitation, paper, foam, fiberglass, or cotton. Filter 12 may be of any suitable size. The size of filter 12 in system 10 may depend on the size of air handler 14. For example, a larger filter 12 may be installed in system 10 to accommodate a larger air handler 14. As air flows through filter 12, filtered particulate may build up on filter 12. After a certain amount of particulate builds up on filter 12, filter 12 may become exhausted and no longer be able to effectively filter the air.

In some embodiments, filter 12 may be coupled to lamp 22. Lamp 22 may emit any type of light or radiation for killing bacteria, deodorizing the air, or performing any other suitable function. Lamp 22 may emit ultraviolet radiation, infrared light, or any other type of light or radiation to facilitate filtering the air. The light in lamp 22 may burn out after a certain period of time. When the light in lamp 22 burns out, lamp 22 may need to be replaced. In some embodiments, replacing lamp 22 may require replacing filter 12 as well. In other embodiments, it may be possible to replace only lamp 22 and not replace filter 12. For example, if lamp 22 has a lifespan of fifteen months, and filter 12 is exhausted within eight months, it may be possible to replace only filter 12 and not lamp 22.

Filter 12 may also be coupled to sensor 16. Sensor 16 may be any device that can detect a drop in pressure across filter 12 as air traverses filter 12. In one embodiment, sensor 16 may comprise two or more sensing components. One or more sensing component may measure air pressure on each side of filter 12. Sensor 16 may convert the measured air pressure into electrical signals. In such an embodiment, sensor 16 may determine the drop in pressure across filter 12 by comparing the values of the electrical signals generated from the air pressure on either side of filter 12. Sensor 16 may also be coupled to controller 18 and may transmit information regarding the drop in air pressure to controller 18.

Air handler 14 may be any apparatus for conditioning and/or distributing air. Air handler 14 may contain a blower, elements for heating or cooling the air, filtering racks, control panels, sound attenuators, or any other components for facilitating conditioning and circulating air. Air handler 14 may be of different sizes and may be able to push air at different flow rates. Air handler 14 may have a maximum flow rate. Similarly, the other components of system 10 may also be incorporated within air handler 14. Air handler 14 may be coupled, either through wires or wirelessly, to controller 18. In some embodiments, air handler 14 may transmit information such as the current air flow rate, the size of the air handler 14, or any other details regarding air handler 14 or filter 12 to controller 18.

Controller 18 may be any module operable to receive information from sensor 16, air handler 14, or any other component of system 10, process that information, and determine the remaining life of filter 16. Controller 18 may comprise an interface 24, a processor 26, and a memory 28.

Interface 24 may be operable to receive information from and transmit information to the various components of system 10. Interface 24 may also communicate with processor 26 and memory 28. Interface 24 represents any port or connection, real or virtual, including any suitable hardware and/or software, including protocol conversion and data processing capabilities, to communicate through a LAN, WAN, or other communication system that allows controller 18 to exchange information with air handler 14, sensor 16, or any other components of system 10.

Processor 26 may be any electronic circuitry, including, but not limited to microprocessors, application specific integrated circuits (ASIC), application specific instruction set processor (ASIP), and/or state machines, that communicatively couples interface 24 and memory 28 and controls the operation of controller 18. In some embodiments, processor 26 may be single core or multi-core having a single chip containing two or more processing devices. Processor 26 may be 8-bit, 16-bit, 32-bit, 64-bit or of any other suitable architecture. Processor 26 may comprise an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. Processor 26 may include other hardware and software that operates to control and process information. Processor 26 may execute computer-executable program instructions stored in memory 28. Processor 26 is not limited to a single processing device and may encompass multiple processing devices.

Memory 28 may include any one or a combination of volatile or non-volatile local or remote devices suitable for storing information. For example, memory 28 may include RAM, ROM, flash memory, magnetic storage devices, optical storage devices, network storage devices, cloud storage devices, solid state devices, or any other suitable information storage device or a combination of these devices. Memory 28 stores, either permanently or temporarily, data, operational software, other information for processor 26, other components of controller 18, or other components of system 10. For example, memory 28 may store user preferences or default settings for operating controller 18. Memory 28 may store information in one or more databases, file systems, tree structures, relational databases, any other suitable storage system, or any combination thereof. Furthermore, different information stored in memory 28 may use any of these storage systems. The information stored in memory 28 may be encrypted or unencrypted, compressed or uncompressed, and static or editable. Memory 28 may store information in one or more caches.

In the present embodiment, memory 28 stores filter characteristics 30. Filter characteristics 30 may include the relationship between air flow rate and pressure drop for one or more clean and exhausted filters of various types and sizes. In one embodiment, filter characteristics 30 may include relationship information for a filter that is of the same type and size as filter 12. Filter characteristics 30 may also contain data defining one or more ranges of pressure drops and air flow rates, including, e.g., an operating range, within which it is possible to determine the remaining life of filter 16. One example of such filter characteristics 30 is illustrated in FIG. 2 and discussed in greater detail with respect to FIG. 2 below. Filter characteristics 30 may also include data showing the effect of using different types of air handlers 14. For example, larger air handlers 14 may have a higher maximum flow rate than smaller air handlers 14. Further, filter characteristics 30 may store how pressure drop across a filter 16 relates to the remaining life of filters that are of the same type as filter 16. For example, filter characteristics 30 may store that the life of filter 16 is linearly related to the pressure drop across filter 16. One example of such a relationship is illustrated in FIG. 3 and explained in greater detail with respect to FIG. 3 below. In other embodiments, the life of filter 16 may be non-linearly related to pressure drop across filter 16. For example, the remaining life of a filter 16 may decay exponentially as the pressure drop across that filter 16 increases. Filter characteristics 30 may also store information regarding the life of lamp 22.

Display 20 may be any device that can display information. In one embodiment, display 20 may display the amount of life remaining of filter 12. Display 20 may provide this information visually or generate an audio alarm when filter 12 needs to be replaced. Display 20 may be coupled to controller 18 and may receive information from controller 18. In some embodiments, display 20 may be a standalone unit or may be communicatively coupled to controller 18, air handler 14 or any other component of system 10.

In operation, air handler 14 pushes air through air filter 12 at a certain flow rate. As air traverses air filter 12, sensor 16 measures the drop in air pressure across air filter 12. Sensor 16 sends this measured drop in air pressure to controller 18. Controller 18 also receives the flow rate of the air flowing out of air handler 14. In one embodiment, air handler 14 may be coupled to controller 18 and may provide controller 18 with the flow rate. Controller 18 then compares the measured pressure drop to the pressure drops stored in filter characteristics 30 at the measured flow rate. If the measured pressure drop and flow rate are in the operating range stored in filter characteristics 30, controller 18 uses the pressure drops and the type of relationship between pressure drop and the remaining life of filter 16 (i.e., linear, exponential etc.) stored in filter characteristics 30 to determine the remaining life of filter 16. Upon determining the remaining life of filter 12, in one embodiment, controller 18 may compare the remaining life of filter 12 with the remaining life of lamp 22. Controller 18 may communicate the remaining life of filter 12, the remaining life of lamp 22, or any combination of the two to display on display 20. For example, controller 18 may compare the remaining life of filter 12 and the remaining life of lamp 22 and display the smaller value on display 20. In one embodiment, controller 18 may also generate an alert if filter 12 and/or lamp 22 are exhausted and/or need to be replaced.

FIG. 2 illustrates chart 50 depicting the relationship between flow rate 52 and pressure drop 54 for a clean filter and an exhausted filter. Filter characteristics 30 in memory 28 may store data for a plurality of relationships such as the ones illustrated in chart 50 for a plurality of different filter types. Filter type may be determined by the size, material, density, or any other aspect of filter 12.

In chart 50, clean filter line 56 shows pressure drop 54 across a clean filter as flow rate 52 increases. As illustrated, in clean filter line 56, pressure drop 54 increases as flow rate 52 increases. The data for clean filter line 56 may be acquired by exposing a clean filter of the same size and type as filter 12 to air pushed out of an air handler 14 and measuring the pressure drop 54 across the clean filter at different flow rates 52.

Exhausted filter line 58 shows pressure drop 54 across an exhausted filter as flow rate 52 increases. As illustrated, in exhausted filter line 58, pressure drop 54 increases as flow rate 52 increases. The data for exhausted filter line 58 may be acquired by exposing an exhausted filter of the same size and type as filter 12, such as a filter that has been saturated by dust, to air pushed out of an air handler 14 and measuring the pressure drop 54 across the exhausted filter at different flow rates 52.

Chart 50 also includes a minimum flow rate 60 and a maximum flow rate 62. Maximum flow rate 62 may be the maximum flow rate that handler 14 can generate. Minimum flow rate 60 may be any value below maximum flow rate 62. In one embodiment, minimum flow rate 60 may be the flow rate at which there is enough difference between clean filter line 56 and exhausted filter line 58 that controller 18 can distinguish between a clean filter and an exhausted filter. In some embodiments, controller 18 may not determine the remaining life of filter 12 unless the flow rate 52 is greater than the minimum flow rate 60.

Chart 50 may be divided into four regions indicated by different hash marks in FIG. 2: damaged region 64, exhausted filter region 66, low air flow region 68, and operating region 70. Controller 18 may determine what information to transmit to the display 20 based on the region within which filter 12 and air hander 14 are operating. The data defining these regions may be stored in filter characteristics 30.

Damaged region 64 may be the region in between minimum flow rate 60 and maximum flow rate 62 where the pressure drop is below the pressure drop of a clean filter, i.e. below clean filter line 56. If filter 12 and air handler 14 are operating in this region, filter 12 may be damaged, for example due to a tear or a misaligned installment, and controller 18 may display an error message on display 20.

Exhausted filter region 66 may be the region in between the minimum flow rate 60 and maximum flow rate 62 where the pressure drop is at or above the pressure drop of an exhausted filter, i.e. at or above exhausted filter line 58. If filter 12 and air handler 14 are operating in this region, filter 12 may be exhausted and controller 18 may display that filter 12 needs to be replaced on display 20. Controller 18 may additionally issue an alert for replacing filter 12.

Low air flow region 68 may be the region below minimum flow rate 60. In this region, controller 18 may not take any measurements and may not display any information on display 18. Alternatively, controller 18 may display that the air flow is too low or may display the remaining lifespan of lamp 22 on display 20 instead.

Operating region 70 is the region in between clean filter line 56 and exhausted filter line 58 for flow rates greater than the minimum flow rate 60 and lower than maximum flow rate 62. If filter 12 and air handler 14 are operating in this region, controller 18 may determine the remaining life of filter 12. One way of calculating the remaining life of filter 12 is illustrated in FIG. 3 and will be discussed in greater detail in reference to FIG. 3 below. When system 10 is operating in this region, controller 18 may display the remaining life of filter 12, the remaining life of lamp 22, or some combination of the two values on display 20. For example, in some embodiments, if the remaining life of lamp 22 is lower than the remaining life of filter 12, controller 18 may display the remaining life of lamp 22 and not the remaining life of filter 12 on display 20.

FIG. 2 also illustrates an example measurement by system 10 in accordance with one embodiment of the present disclosure. The example measurement of FIG. 2 is meant to be illustrative only and in no way limits the disclosure of the present embodiment. The purpose of this example measurement is to better explain the functioning of system 10. The example measurement will be carried forward from FIG. 2 to FIG. 4. In this example measurement, air handler 14 generates air flow at air flow rate X and sensor 16 measures a pressure drop of Y to yield the value (X,Y) 72. FIG. 2 also illustrates that at flow rate X, the pressure drop for a clean filter is Y' 74 and the pressure drop for an exhausted filter is Y" 76. As explained below in reference to FIG. 3, controller 18 uses these values to determine the remaining life of filter 12.

FIG. 3 carries forward the example measurement of FIG. 2 and illustrates how controller 18 uses data from chart 50 stored in filter characteristics 30 to determine the percentage of life remaining 102 of filter 12 in one example. FIG. 3 illustrates a chart 100 showing the relationship between the pressure drop 54 and the percentage of life remaining 102 of filter 12 while air handler 14 pushes air at flow rate X.

In chart 100, the pressure drop 54 ranges from the pressure drop for clean filter Y' 74 to the pressure drop for exhausted filter Y" 76 at flow rate X stored in filtering characteristics 30. Thus, when the pressure drop 54 across filter 12 is the pressure drop for clean filter Y' 74, filter 12 has 100% life remaining. Conversely, when the pressure drop 54 across filter 12 is the pressure drop for exhausted filter Y" 76, filter 12 has 0% life remaining. With these two known values, controller 18 may use the relationship between percentage of life remaining 102 and pressure drop 54 stored in filter characteristics 30 to generate a function extrapolating the percentage of life remaining 102 for filter 12 at various pressure drop 54 between the pressure drop for a clean filter (e.g. Y' 74) and the pressure drop for an exhausted filter (e.g. Y" 76). In this embodiment, it is assumed that the life remaining of filter 12 is linearly related to the drop in pressure across filter 12. As noted earlier, in other embodiments, the life remaining 102 of filter 12 may be related to pressure drop 54 in any suitable manner including any non-linear manner.

In the example measurement, controller 18 may use the measured value (X,Y) 72 to determine that at flow rate X, the pressure drop for filter 12 is Y. Using this information, controller 18 can determine the percentage life remaining for filter 12 using the generated function. For instance, in the example measurement, filter 12 has 50% life remaining. Upon determining this value, controller 18 may display that filter 12 has 50% life remaining on display 20.

FIG. 4 illustrates a chart 150 showing the relationship between the percent life remaining 152 of lamp 22 and time elapsed 154. In this embodiment, it is assumed that the percent life remaining 152 of lamp 22 is linearly related to time elapsed 154. In other embodiments, the relationship may be of any other suitable type including a non-linear relationship. Filter characteristics 30 may store the relationship between time elapsed 154 since installation and the life remaining 152 of lamp 22. Thus, provided that controller 18 knows how much time has elapsed since lamp 22 was installed, controller 18 can determine the percent of life remaining 152 of lamp 22. In one embodiment, a user may enter the date lamp 22 is installed into controller 18 or may reset controller 18 when lamp 22 is installed and controller 18 may keep track of the amount of time since the installation of lamp 22. In one embodiment, lamp 22 may be selected so that its lifetime is substantially similar to the expected lifetime of filter 12. For instance, an operator may use historical data of the average lifetime of a filter 12 to determine the appropriate lamp 22 to be used with filter 12. The lifetime of lamp 22 may thus serve as a substitute for determining the life of filter 12 in the event that controller 18 malfunctions.

In the example illustrated in FIG. 4, it is assumed that lamp 22 has a lifetime of 15 months and that 10 months have elapsed since lamp 22 was installed. Because, in the present example, the percent of life remaining 152 of lamp 22 is linearly related to time elapsed 154, controller 18 can determine that lamp 22 has 33% life remaining. In certain embodiments, controller 18 may display either the percent life remaining of lamp 22 or the percent life remaining of filter 12 on display 20. In one such embodiment, controller 18 may display the smaller of the two values. Because, in the example measurement of FIGS. 2-4, the percent life remaining 152 of lamp 22 is lower than the percent life remaining 102 of filter 12, controller 18 may display the percent life remaining 152 of lamp 22 on display 20.

FIG. 5 illustrates a flow chart 200 showing an example method performed by controller 18 to determine the life of filter 12 during operation of system 10. The method starts at step 202 where controller 18 receives the air handler 14 flow rate 52 and the pressure drop 54 across filter 12. Next, at step 204, controller 18 compares the received flow rate 52 with the minimum flow rate 60 of air handler 14 stored in filter characteristics 30. At step 206, if the received flow rate 52 is less than minimum flow rate 60 then, at step 208, controller 18 may determine, based, for example, on user preferences or controller 18 settings, whether or not to display the life remaining of lamp 22. Controller 18 may then either instruct display 20 to display a message indicating that the flow rate is too low to calculate the life of filter 12 at step 210 or display the life remaining of lamp 22 at step 212. To display the life remaining of lamp 22, controller 18 may first determine the life remaining 152 of lamp 22 in the manner described above with reference to FIG. 4. The method may then end.

At step 206, if the received flow rate 52 is equal to or greater than minimum flow rate 60, controller 18 may, at step 214, compare the received pressure drop 54 with the pressure drop of clean filter line 56 at the received flow rate 52. At step 216, controller 18 may determine if the received pressure drop 54 is below the pressure drop of clean filter line 56 at the received flow rate 52. If the received pressure drop 54 is below the pressure drop of clean filter line 56 at received flow rate 52, at step 218 controller 18 may determine, based, for example, on user preferences or controller 18 settings, whether or not to display the life remaining of lamp 22. Controller 18 may then either instruct display 20 to display a message indicating that filter 12 is damaged or display some other suitable error message at step 220 or display the life remaining of lamp 22 at step 212. To display the life remaining of lamp 22, controller 18 may first determine the life remaining 152 of lamp 22 in the manner described above with reference to FIG. 4. The method may then end.

At step 216, if the received pressure drop 54 is at or above the pressure drop of clean filter line 56 of the received flow rate 52, controller 18 may, at step 222, compare the received pressure drop 54 with the pressure drop of exhausted filter line 58 at the received flow rate 52. At step 224, controller 18 may determine whether the received pressure drop 50 is at or above the pressure drop of exhausted filter line 58 at the received flow rate 52. If the received pressure drop 54 is at or above the pressure drop of exhausted filter line 58 at the received flow rate 52, at step 226, controller 18 may instruct display 20 to display any suitable message indicating that filter 12 is exhausted and needs to be replaced. Controller 18 may, in one or more embodiments, issue an alert that filter 12 is exhausted. The method may then end.

At step 224, if the received pressure drop is below the pressure drop 54 of exhausted filter line 58 at the received flow rate 52, controller 18 may, at step 228, generate a functional relationship between pressure drop 54 and the percent life remaining 102 of filter 12 using the pressure drop of exhausted filter line 58 and clean filter line 56 at the received flow rate 52 stored in filter characteristics 30 as described above in relation to FIG. 3. At step 230, controller 18 may use that generated functional relationship to determine the percentage of life remaining 102 of filter 12 at the received pressure drop 54. Controller 18 may also, at step 232, determine the percentage of life remaining 152 of lamp 22 in the manner described above with reference to FIG. 4. At step 234, controller 18 may compare the percent life remaining 152 of lamp 22 against the percent life remaining 102 of filter 12 and, at step 236, controller 18 may direct display 20 to display an appropriate value including, for example, the smaller of the two values. The method may then end.

Modifications, additions, or omissions may be made to the systems, apparatuses, and processes described herein without departing from the scope of the disclosure. The components of the systems and apparatuses may be integrated or separated. Moreover, the operations of the systems and apparatuses may be performed by more, fewer, or other components. The methods may include more, fewer, or other steps. Additionally, steps may be performed in any suitable order. Additionally, operations of the systems and apparatuses may be performed using any suitable logic. As used in this document, "each" refers to each member of a set or each member of a subset of a set.

Although several embodiments have been illustrated and described in detail, it will be recognized that substitutions and alterations are possible without departing from the spirit and scope of the present disclosure, as defined by the appended claims. To aid the Patent Office, and any readers of any patent issued on this application in interpreting the claims appended hereto, applicants wish to note that they do not intend any of the appended claims to invoke 35 U.S.C. §112(f) as it exists on the date of filing hereof unless the words "means for" or "step for" are explicitly used in the particular claim.

What is claimed is:
1. A system comprising:
   a filter having a filter type;
   a sensor operable to communicate with a controller, the sensor being coupled to the filter and operable to measure a pressure drop across the filter;
   an air handler operable to communicate with the controller and push air through the filter at a particular air flow rate;
   the controller comprising:
      an interface connection operable to receive first information indicating the air flow rate of the air handler and second information indicating the pressure drop across the filter;
      a memory operable to store:
         a first relationship between pressure drop and air flow rate for the filter type when the filter is exhausted;
         a second relationship between pressure drop and air flow rate for the filter type when the filter is clean;
         a third relationship between pressure drop and remaining life for the filter type at one or more air flow rates; and
         an operating region defined by:
            an air flow rate that is greater than a minimum air flow rate and lower than a maximum air flow rate; and
            a pressure drop that is lower than the pressure drop generated from the first relationship and higher than the pressure drop generated from the second relationship;
      a microprocessor operable to:
         determine whether the first information and the second information are within the operating region; and
         in response to determining that the first information and the second information are within the operating region, generate a fourth information indicating the remaining life of the filter using the third relationship stored in the memory; and a display coupled to the controller and operable to display the fourth information.

2. The system of claim 1, wherein
the memory is further operable to store a damaged region defined by an air flow rate that is greater than the minimum air flow rate and a pressure drop that is lower than the pressure drop generated from the second relationship;
the microprocessor is further operable to:
determine whether the first information and the second information are within the damaged region; and
in response to determining that the first information and the second information are within the damaged region, generate a fifth information indicating that the filter is damaged; and
the display is further operable to display the fifth information.

3. The system of claim 1, wherein
the memory is further operable to store an exhausted filter region defined by an air flow rate that is greater than the minimum air flow rate and a pressure drop that is greater than the pressure drop generated from the first relationship; and
the microprocessor is further operable to:
determine whether the first information and the second information are within the exhausted filter region; and
in response to determining that the first information and the second information are within the exhausted filter region, generate a fifth information indicating that the filter is exhausted; and
the display is further operable to display the fifth information.

4. The system of claim 1, wherein
the memory is further operable to store a low air flow region defined by an air flow rate that is below the minimum air flow rate; and
the microprocessor is further operable to:
determine whether the first information is within the low air flow region; and
in response to determining that the first information is within the low air flow region, generate a fifth information indicating that the air flow is low; and
the display is further operable to display the fifth information.

5. The system of claim 1, further comprising a lamp with a predetermined lifespan coupled to the filter.

6. The system of claim 5, wherein the microprocessor compares the remaining life of the filter against the predetermined lifespan of the lamp and transmits the smaller of the two values to the display.

7. The system of claim 1, wherein the air handler is further operable to transmit the size of the air handler and the air flow rate to the controller.

8. The system of claim 1, wherein the controller is further operable to issue an alert when the remaining life of the filter is below a threshold value.

9. A method comprising:
communicating a first information indicating a pressure drop across a filter having a filter type to a controller;
communicating a second information indicating an air flow rate of an air handler to the controller;
determining whether the first information and the second information are within an operating region wherein the operating region is defined by:
the air flow rate being greater than a minimum air flow rate and lower than a maximum air flow rate;
the pressure drop being lower than the pressure drop generated from a first relationship wherein the first relationship comprises a relationship between pressure drop and air flow rate for the filter type when the filter is exhausted; and
the pressure drop being greater than the pressure drop generated from a second relationship wherein the second relationship comprises a relationship between pressure drop and air flow rate for the filter type when the filter is clean;
in response to determining that the first information and the second information are within the operating region, generating a fourth information indicating the remaining life of the filter using a relationship between pressure drop and remaining life for the filter type at one or more air flow rates; and
displaying the fourth information.

10. The method of claim 9, further comprising:
determining whether the first information and the second information are within a damaged region wherein the damaged region is defined by:
the air flow rate being greater than a minimum air flow rate and lower than a maximum air flow rate; and
the pressure drop being lower than the pressure drop generated from the second relationship;
in response to determining that the first information and the second information are within the damaged region, generating a fifth information indicating that the filter is damaged; and
displaying the fifth information.

11. The method of claim 9, further comprising:
determining whether the first information and the second information are within an exhausted filter region wherein the exhausted filter region is defined by:
the air flow rate being greater than a minimum air flow rate and lower than a maximum air flow rate; and
the pressure drop being greater than the pressure drop generated from the first relationship;
in response to determining that the first information and the second information are within the exhausted filter region, generating a fifth information indicating that the filter is exhausted; and
displaying the fifth information.

12. The method of claim 9, further comprising:
determining whether the first information is within a low air flow region wherein the low air flow region is defined by the air flow rate being lower than the minimum air flow rate;
in response to determining that the first information is within the low air flow region, generating a fifth information indicating that the air flow is low; and
displaying the fifth information.

13. The method of claim 9, further comprising issuing an alert when the remaining life of the filter is below a threshold value.

14. The method of claim 9, further comprising comparing the remaining life of the filter against the predetermined lifespan of a lamp coupled to the filter and transmitting the smaller of the two values to the display.

15. A controller comprising:
an interface connection operable to:
receive a first information indicating a pressure drop across a filter having a filter type;
receive a second information indicating an air flow rate of an air handler;

a memory operable to store:
  a first relationship between pressure drop and air flow rate for the filter type when the filter is exhausted;
  a second relationship between pressure drop and air flow rate for the filter type when the filter is clean;
  a third relationship between pressure drop and remaining life for the filter type at one or more air flow rates; and
  an operating region defined by:
    an air flow rate that is greater than a minimum air flow rate and lower than a maximum air flow rate; and
    a pressure drop that is lower than the pressure drop generated from the first relationship and higher than the pressure drop generated from the second relationship; and
a microprocessor operable to:
  determine whether the first information and the second information are within the operating region; and
  in response to determining that the first information and the second information are within the operating region, generate a fourth information indicating the remaining life of the filter using the third relationship stored in the memory; and
  generate instructions for displaying the fourth information.

16. The controller of claim 15, wherein
the memory is further operable to store a damaged region defined by an air flow rate that is greater than the minimum air flow rate and a pressure drop that is lower than the pressure drop generated from the second relationship;
the microprocessor is further operable to:
  determine whether the first information and the second information are within the damaged region;
  in response to determining that the first information and the second information are within the damaged region, generate a fifth information indicating that the filter is damaged; and
generate instructions for displaying the fifth information.

17. The controller of claim 15, wherein
the memory is further operable to store an exhausted filter region defined by an air flow rate that is greater than the minimum air flow rate and a pressure drop that is greater than the pressure drop generated from the first relationship; and
the microprocessor is further operable to:
  determine whether the first information and the second information are within the exhausted filter region;
  in response to determining that the first information and the second information are within the exhausted filter region, generate a fifth information indicating that the filter is exhausted; and
  generate instructions for displaying the fifth information.

18. The controller of claim 15, wherein
the memory is further operable to store a low air flow region defined by an air flow rate that is below the minimum air flow rate; and
the microprocessor is further operable to:
  determine whether the first information is within the low air flow region;
  in response to determining that the first information is within the low air flow region, generate a fifth information indicating that the air flow is low; and
  generate instructions for displaying the fifth information.

19. The controller of claim 15, wherein
the interface connection further receives the predetermined lifespan of a lamp coupled to the filter; and
the microprocessor further compares the remaining life of the filter against the predetermined life span of the lamp and generates instructions for displaying the smaller of the two values.

20. The controller of claim 15, wherein the microprocessor is further operable to issue an alert when the remaining life of the first filter is below a threshold value.

* * * * *